United States Patent [19]

Miller

[11] 4,150,403
[45] Apr. 17, 1979

[54] CIRCUIT ARRANGEMENTS FOR CALIBRATING SIGNALS

[75] Inventor: Stanley P. Miller, Burton-on-Trent, England

[73] Assignee: Coal Industry (Patents) Limited, London, England

[21] Appl. No.: 728,558

[22] Filed: Oct. 1, 1976

[30] Foreign Application Priority Data

Oct. 24, 1975 [GB] United Kingdom ............... 43780/75

[51] Int. Cl.² .............................................. G11B 5/02
[52] U.S. Cl. ........................................ 360/27; 360/68
[58] Field of Search .................. 360/6, 25, 67, 68, 27, 360/28

[56] References Cited

U.S. PATENT DOCUMENTS

| 3,727,012 | 4/1973 | Cox et al. | 360/27 |
| 3,869,707 | 3/1975 | Cupp | 360/6 |
| 3,934,267 | 1/1976 | Koska et al. | 360/6 |

Primary Examiner—Vincent P. Canney
Attorney, Agent, or Firm—James C. Wray

[57] ABSTRACT

A circuit arrangement for calibrating a signal by calibrating a storage medium upon which the signal is recorded comprising circuits for producing calibration signals and for interfacing information, calibration and marking signals, a timing and control circuit for controlling periods of calibrating signals recorded on the storage medium and derived by a calibrating circuit.

A circuit for providing marking of an event external to the signal is provided.

5 Claims, 3 Drawing Figures

CIRCUIT ARRANGEMENTS FOR CALIBRATING SIGNALS

This invention relates to circuit arrangements for calibrating signals by calibrating storage media, for example electromagnetic tape, upon which the signals are recorded.

In many applications it is necessary to use a first piece or set of equipment to record a signal indicative of an event and a second separate piece or set of equipment to process or relate the signal so recorded. Usually the second piece or set of equipment has its own controls which can be operated independently of the first piece or set of equipment. Consequently, the recorded signal must be calibrated.

According to the present invention a circuit arrangement for calibrating a signal by calibrating a storage medium upon which the signal is recorded comprises a calibrating circuit arranged to derive a calibrating signal having at least two values corresponding to fixed, preselected points in the operating range of the signal to be calibrated, and a timing and control circuit for controlling the periods of the said at least two values of the calibration signal.

Advantageously, the circuit arrangement includes a marker circuit for deriving an event marker signal.

Conveniently, at least part of the marker circuit is included in at least part of the calibrating circuit.

Preferably, the calibrating circuit comprises at least two subcircuits deriving the fixed preselected points, respectively.

Preferably, said fixed preselected points are voltage levels.

Advantageously, the timing and control circuit includes switching circuits controlling the calibrating circuit.

Conveniently, the timing and control circuit includes integrated circuit timers arranged as monostable mode and astable mode circuits.

Advantageously, at least part of the monostable mode circuit is at least part of the marker circuit.

Preferably, the timing and control circuit comprises a decade counter arranged to receive pulses derived from the astable mode circuit and arranged to derive a pulse when a preselected number of pulses have been received.

Conveniently, the timing and control circuit comprises a plurality of decade counters arranged in sequence.

Conveniently, the monostable mode circuit pulse fed to the calibrating circuit is tapped to set or reset the decade counters, before or after the event signal has been recorded.

Preferably, the circuit arrangement includes a resetting circuit arranged to override the timing control circuit.

By way of example only, one form of circuit arrangement constructed in accordance with the present invention is described below with reference to the accompanying drawing which shows a circuit diagram. It is to be understood in this example, that although some specific numerical examples are given for values of circuit parameters, in order to facilitate understanding, the invention is in no way limited to those values and different values can be used in other forms of circuit arrangement according to the invention.

In this example, the circuit arrangement is used in conjunction with a multi-channel tape recorder for recording signals from various monitoring instruments in a coal mine. The monitoring instrument are transducers having a 0–2 V dc range and a 0.4 V offset zero so that a continuous 0 V signal indicates a system failure or some other signal.

The multi channel tape recorder operates at voltage levels between +25 mV and −25 mV and consequently the circuit arrangement includes an interface circuit for conversion between the respective ranges of the transducers and the tape recorder.

The playback recorder has an independent gain control which is uncalibrated and consequently in order that the transducers can be absolutely calibrated, it is necessary that a calibration signal be recorded on the tape.

The tape recorder operates at a tape speed which is one twentieth of that at which the tape is subsequently played back. In this example, twelve to fifteen seconds is adequate for calibration at any voltage level during playback, and in consequence a recording period of about four to five minutes is required at that voltage level.

In this example, before the calibration signal a recognition signal, derived within the circuit arrangement for computer analysis purposes, is recorded for one and a quarter minutes. The sequence of recognition and calibration signals produced by the present invention is then; a recognition signal recorded at 0 V for one and a quarter minutes, a calibration signal recorded at 1 V for three and three quarter minutes, a calibration signal recorded at 0 V for five minutes. The total replay time for the recognition and calibration signals is thirty seconds.

Occurrence of an external event may be marked on the tape by recording a signal, generated within the circuit arrangement, the signal being recorded at 0 V for two seconds and appearing as a tenth of a second blip on playback.

The circuit arrangement of the present invention acts as an interface between transducers and the first piece or set of equipment. The interface marks the storage medium upon which the signals are recorded with calibration signals in the operating range of the transducers, such that the recorded transducer signals may be meaningfully analyzed by the second piece or set of equipment. The second piece or set of equipment, for example, computer means having separate controls, such as gain controls, from the first piece or set of equipment.

The invention thus eliminates errors for example from the recording/playback of information from safety transducers, so that potentially dangerous faults are located and are not marked by faulty calibration.

FIGS. 1, A–F, 2, and 3 show parts of a circuit which are connected at points A through P respectively.

Figure 1:
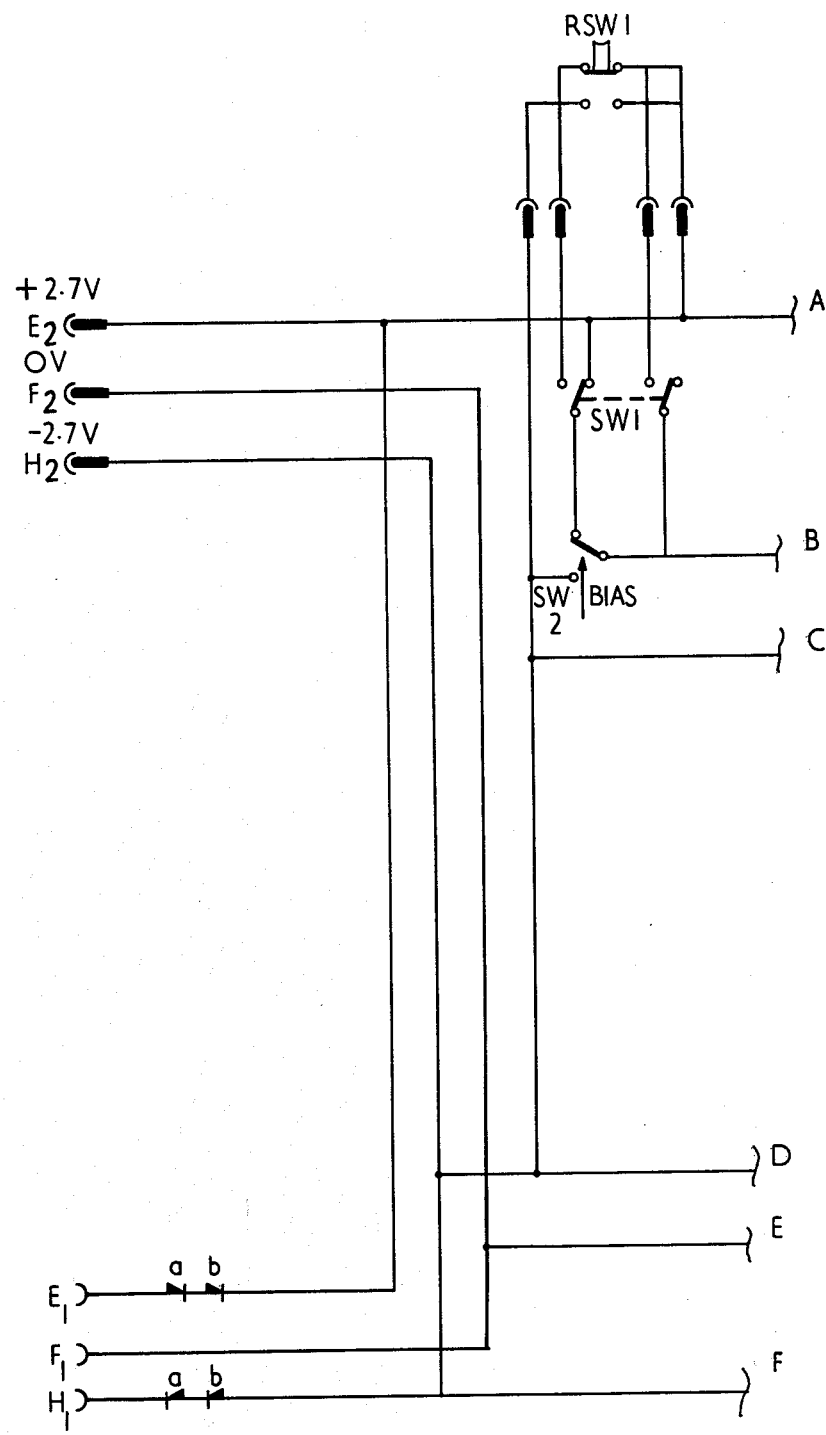
FIG. 1 shows a power supply and event marking switches.

Referring now to the drawing, it can, for convenience, be divided into three circuits, although some components within each of the three circuits overlap. The drawing comprises an interface circuit for converting 0-2 V from the transducers to ±25 mV, a timing and control circuit and a calibration circuit.

Figure 3:
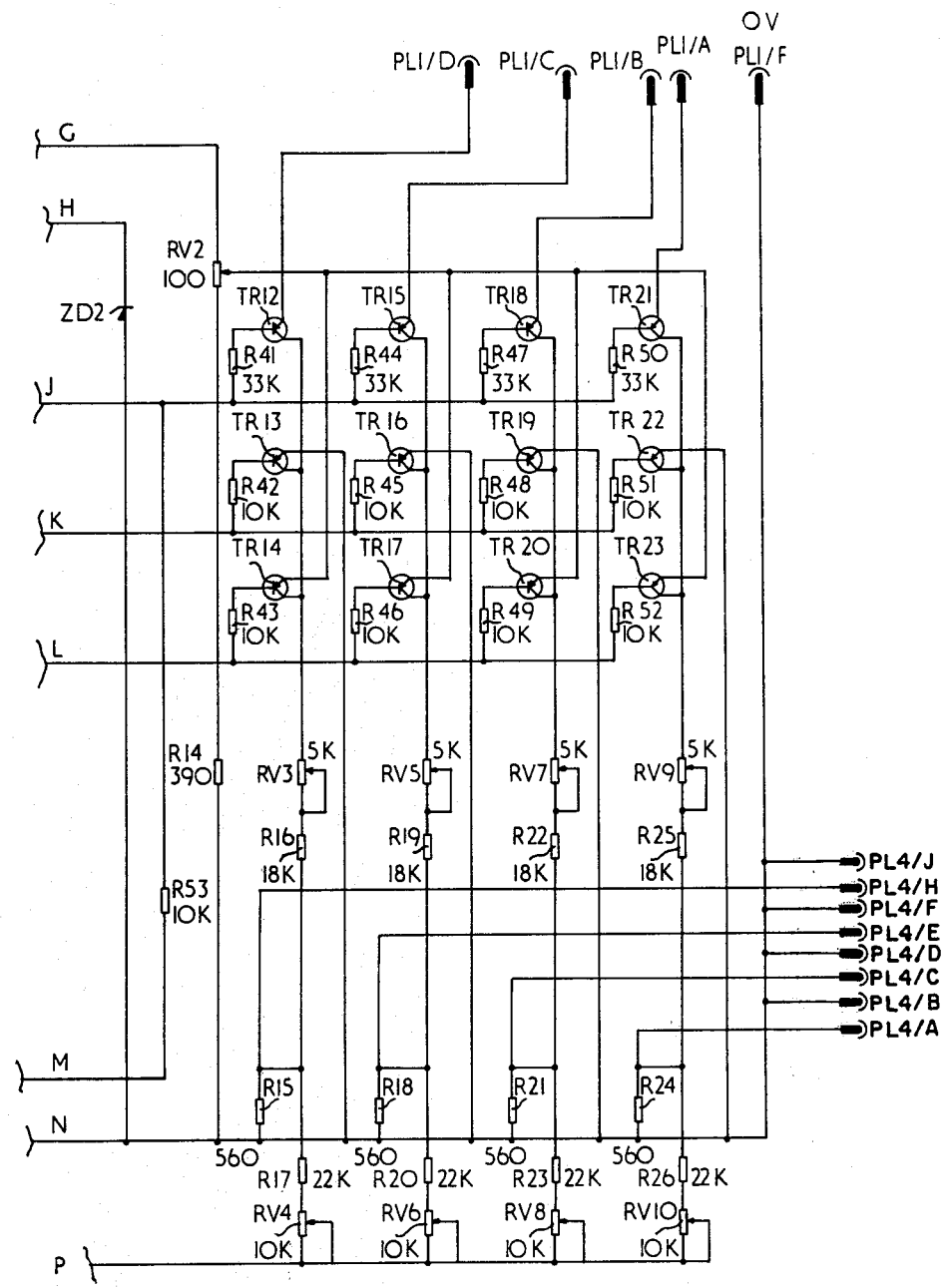
FIG. 3 shows an interface circuit having connections at points S, T, U, V, W, X, Y and Z to the marker and calibration signal timing and control circuits of FIG. 2 and having connections to the transducer inputs and outputs to a tape recorder.

In this example, the circuit arrangement is used in conjunction with a four channel tape recorder (not shown) and four of the previously mentioned transducers (not shown). Input terminal PL1/A, PL1/B, PL1/C and PL1/D, as shown in FIG. 3, are connected to the four previously mentioned transducers and PL1/F is connected to their common 0 V reference line. Output terminals PL4/A, B, C, D, E, F, H, J are connected to the four-channel tape recorder. The circuit arrangement is powered through terminals $E_1$, $F_1$, and $H_1$, or $E_2$, $F_2$, and $H_2$ as shown in FIG. 1 at +2.7 V, 0 V and −2.7 V respectively. Considering the channel through input terminal PL1/A, the interface circuit which converts 0-2 V dc into ±25 mV at terminals A, B comprise resistors RV9, R25, R26 and RV10 biased from a voltage of approximately −1.2 V developed, from the input of −2.7 V through terminals $F_1$ and $H_1$, at the emitter of a transistor TR1 and stabilised by a Zener diode ZD1. Stability of the approximately −1.2 V is important but its absolute value is not. Variable resistors RV9 and RV10 allow adjustment of the voltages.

During recording of incoming signals through PL1/A, the signals are connected to the interface circuit by a transistor TR21. The transistor TR21 can be turned off by transistor TR6 when actuated by the timing and control circuit as described later in the specification, but during recording of the incoming signals which are in the range 0.4 to 2 V and are from one of the previously mentioned transducers (not shown), TR6 is turned off, and TR21 conducts. The emitter base current of TR21 is from the terminal PL1/A through a base resistor R50 and a resistor R53 to −2.7 V. Thus the incoming signal is connected to the variable resistor RV9.

Transistors TR22 and TR23 are held off as described later in the specification, because collector voltages of transistor TR8 and TR10 are high. The three remaining channels through input terminals PL1/B, PL1/C and PL1/D function in an identical manner to channel PL1/A using their corresponding transistors and resistors: TR18, RV7, R22, R21, R23, RV8; TR15, RV5, R19, R18, R20, RV6; and TR12, RV3, R16, R15, R17, RV4, respectively.

Figure 2:
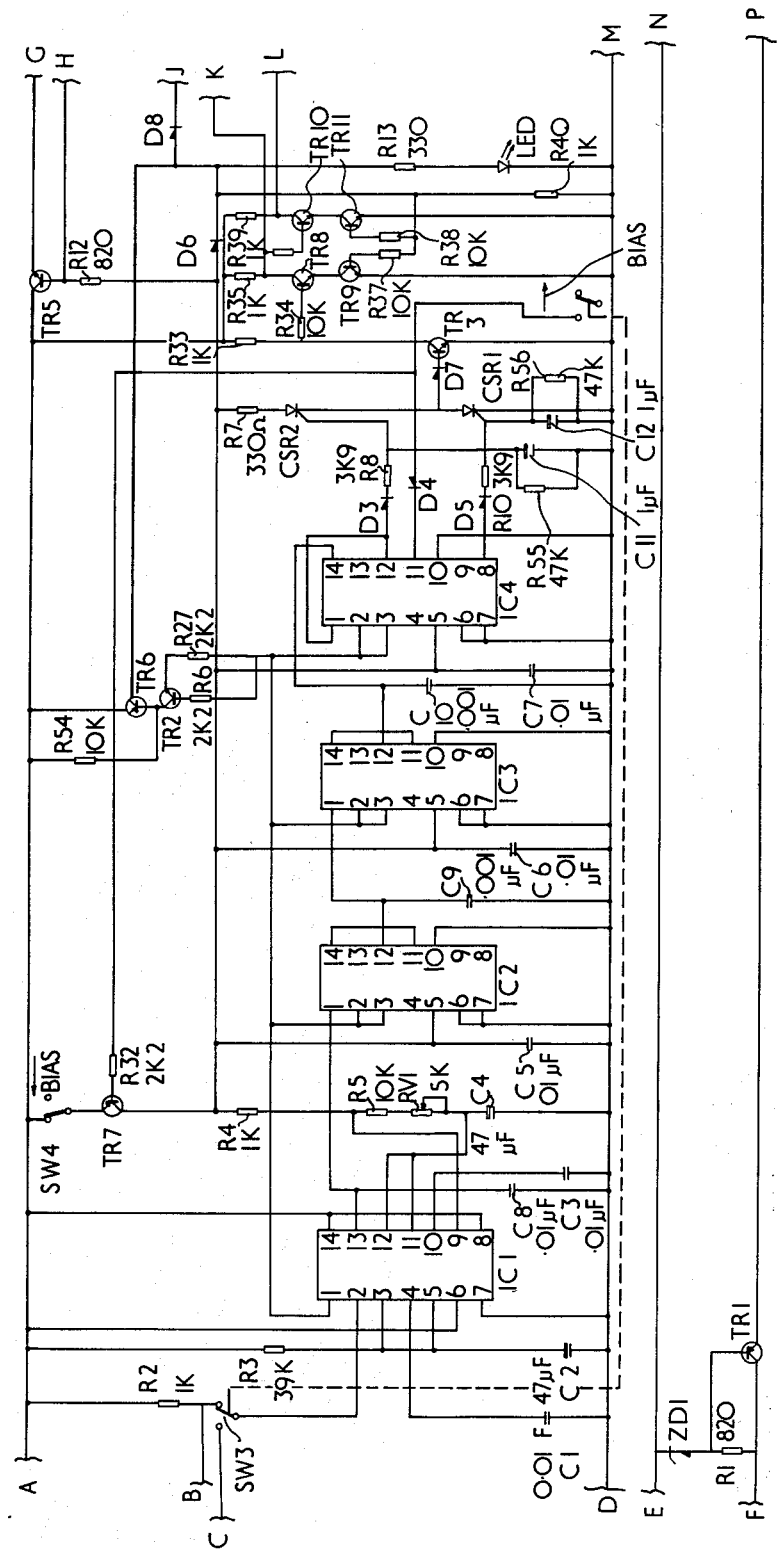
FIG. 2 shows timing and control circuits, which are connected at points O, M, N, P, Q and R to the power supply of FIG. 1.

Referring now to the timing and control circuit shown in FIG. 2, this comprises four integrated circuits IC1, IC2, IC3, IC4 and their associated components, the integrated circuits being controlled by switches SW3 biased in the direction shown. The integrated circuit IC1 is a dual integrated circuit timer comprising a monostable mode circuit and an astable mode circuit. The monostable mode circuit provides a pulse of two seconds duration when connected to terminal $H_1$ upon actuation of biased event marking switch SW2 or linked calibration trigger switches SW3, the pulse being derived on pin 1. The two second pulse is used, as described later in the specification, in order that an event external to the transducers may be marked on the tape and in order that integrated circuits IC2, IC3 and IC4 may be reset. The duration of the pulse, in this example two seconds, is determined by values chosen for a resistor R3 and a capacitor C2, which operate in unison with the integrated circuit IC1.

The astable mode circuit is arranged to have high and low voltage output periods determined by values of resistors R4, R5 variable resistor RV1 and capacitor C4, which work in unison with the astable circuit of IC1. In this example the astable circuit is arranged to have a switching frequency of 1.33 Hz on pin 13.

Capacitors C1, C3, C5 and C6 and capacitors C7, C8, C9, and C10 respectively cooperate with the integrated circuits IC1, IC2, IC3, and IC4.

Integrated circuits IC2, IC3 are decade counters arranged to divide the frequency successively by ten, i.e. by one hundred in toto. Consequently, the output frequency on pin 12 of integrated circuit IC3 after division by the counters is 0.0133 Hz.

The integrated circuit IC4 is arranged to have a count of one on pin 12, four on pin 8 and eight on pin 11. Since the counted frequency is 0.0133 Hz, one count on IC4 will correspond to one and a quarter minutes.

A high output will therefore occur on pin 12 of IC4 after one and a quarter minutes, on pin 8 after five minutes and on pin 11 after ten minutes. Transistors TR8, TR9, TR10 and TR11 are arranged as Nand gates, controlled by transistors TR3 and TR7 which are in turn controlled by silicon controlled rectifiers CSR1 and CSR2.

The calibration circuit of the present invention comprises circuitry for supplying signals forming a calibration sequence to calibrate the tape, the signals having values of 0 V and 1 V, respectively, corresponding to bottom and mid span of the signal range from the transducers. Considering channel PL1/A, when TR21 is turned off and TR22 turned on, the interface circuit is connected to 0 V. When TR22 is turned off and TR23 turned on, then the interface is connected to a stabilised 1 V dc signal. The stabilised 1 V signal is developed at the wiper of variable resistor RV2. The resistor RV2 has a potential of 1.2 V approximately across it, the 1.2 V being developed at the emitter of TR5 (with base resistor R12) and being stabilised by a Zener diode ZD2.

In normal operation of the previously mentioned transducers and tape recorder, the transistor TR21 of the present invention is turned on and signals from the transducers are recorded upon the tape, after being transformed from the range 0-2 V to ±25 mV by the interface of the present invention. Upon calibration of the tape by the circuit arrangement of the present invention, the transistor TR21 is turned off. The transistor TR21 is turned off by the collector of transistor TR6 which goes high. The transistor TR6 goes high when the collector of transistor TR2 goes high, after receiving a signal from pin 1 of the integrated circuit IC1. Resistors R6 and R27 cooperate with transistor TR2. The signal from pin 1 of IC1, being derived by the monostable circuit of IC1, is also used to reset the decade counters IC2, IC3 and IC4 through their respective pins 2 and 3 as mentioned previously. The interface circuit is connected to 0 V while the decade counters are inhibited and in consequence an external event may be marked by actuation of switch SW2 as mentioned previously. The tape may alternatively be marked by actuation of an event marker switch RSW1 and SW1 which may be remote from the circuit arrangement. A light emitting diode LED is energised whenever event marking or calibration is taking place to show that external signals are not being recorded at that time.

After one and a quarter minutes, pin 12 of IC4 goes high to turn off the transistor TR22 and turn on the transistor TR23, since the silicon controlled rectifier CSR2, with an anode resistor R7 which controls transistor TR3, is triggered. Transistor TR3 in turn controls the Nand Transistor TR8, TR9, TR10 and TR11. Resistors R34, R37, and R38 are base resistors, and resistors R33 and R39 are related to this circuit. The signal 1 V is thereby connected to the interface circuit.

After a further three and three quarter minutes, pin 8 of the integrated circuit IC4 goes high to turn the transistor TR23 off and the transistor TR22 on, since the silicon controlled rectifier CSR1 is triggered, effectively reversing the operation of pin 12 described above. The signal of 0 V is thereby connected to the interface circuit. Resistors R51 and R52 are conventional base resistors for transistors TR22 and TR23. Resistor R24 connects the recorder terminal A of PL4 to terminals F1, F2.

After a further five minutes, the calibration of the tape is brought to an end by pin 11 of IC4 going high. Pin 11 of IC4 turns off transistor TR7, which causes the integrated circuit IC1 to be reset. The resetting operation of IC1 may also be done by a biased switch SW4 which overrides the timing and control circuit. When IC1 is reset, the transistor TR6 is turned off so that the transistor TR21 again conducts and the transducers (not shown) are again connected to the tape recorder (not shown).

The calibration sequence of the circuit arrangement of the present invention is then completed.

Conducting silicon diodes D3, D4, D5, D6, D7 and D8 are provided in the circuit arrangement to prevent faulty operation.

Capacitors C11 and C12 and resistors R55 and R56 are employed to prevent spurious triggering of the silicon controlled rectifiers CSR1 and CSR2 as a result of transient signals which could arise during the calibration sequence.

It is to be understood that channels PL1/B, PL1/C and PL1/D function analogously to channel PL1/A in the present inventions so that transistor TR12, TR15 and TR18 correspond to transistor TR21, transistors TR13, TR16, TR19 correspond to transistor TR22, and TR14, TR17, TR22 correspond to transistor TR23. Resistors R40 and R13 cooperate with the LED.

The calibration circuit may comprise relays instead of transistorised switches if required.

I claim:

1. A circuit arrangement for calibrating a signal by calibrating a storage medium upon which the signal is recorded comprising a calibrating circuit arranged to derive a calibrating signal having at least two values corresponding to fixed, preselected points which are voltage levels, in the operating range of the signal to be calibrated, the calibrating circuit comprising at least two sub circuits deriving the fixed, preselected points, respectively and a timing and control circuit for controlling the periods of the said at least two values of the calibration signal, the timing and control circuit comprising a timing circuit including switching circuit controlling the calibrating circuit, the timing and control circuit includes two integrated circuit times arranged as monostable mode and astable mode circuits, respectively, wherein the circuit arrangement includes a marker circuit for deriving an event marker signal, and wherein at least part of the marker circuit is included in at least part of the calibrating circuit.

2. A circuit arrangement as claimed in claim 1, wherein the circuit arrangement includes a marker circuit for deriving an event marker signal comprising at least part of the monostable mode circuit.

3. A circuit arrangement as claimed in claim 1, wherein the timing and control circuit comprises decade counters arranged to receive pulses derived from the astable mode circuit and arranged to derive a pulse when a preselected number of pulses has been received.

4. A circuit arrangement as claimed in claim 2, wherein the monostable mode circuit pulse fed to the marker circuit is tapped to set or reset the decade counters, before or after the event signal has been recorded.

5. A circuit arrangement as claimed in claim 1, wherein the circuit arrangement includes a resetting circuit arranged to override the timing and control circuit, the resetting circuit including the monostable mode circuit.

* * * * *